United States Patent Office 3,435,033
Patented Mar. 25, 1969

3,435,033
INDOLIZINONE DERIVATIVES
Janis Plostnieks, Philadelphia, Pa., assignor to McNeil Laboratories, Inc., a corporation of Pennsylvania
No Drawing. Continuation-in-part of application Ser. No. 428,529, Jan. 27, 1965. This application May 2, 1967, Ser. No. 635,387
Int. Cl. C07d 87/20, 29/24, 29/20
U.S. Cl. 260—244         4 Claims

ABSTRACT OF THE DISCLOSURE

The compounds are of the class of hydro-indolizinone derivatives useful as central nervous system depressants.

---

This is a continuation-in-part application of my copending application, Ser. No. 428,529, filed Jan. 27, 1965, now abandoned.

The compounds of this invention may be represented by the following structural formulas:

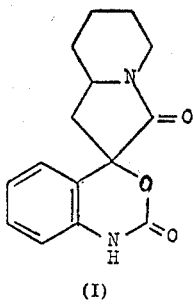

(I)

and

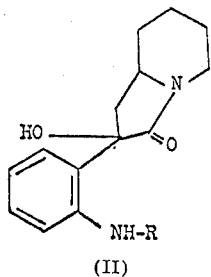

(II)

wherein R is a member selected from the group consisting of hydrogen and carboxylic acyl, including the aliphatic, aromatic and heterocyclic acyls. Typical of the acyls that are operable herein are the lower alkylcarbonyls, e.g., acetyl, propionyl, butyryl and the like; benzoyl; phenylacetyl; diphenylacetyl; furoyl; and the like. The therapeutically useful acid addition salts of (II), in which R is hydrogen, are also included within the scope of this invention.

A starting material for the subject compounds is 3-hydroxy-3-(2 - piperidylmenthyl)-2-indolinone, preferably in the form of its acid addition salt, e.g., the corresponding hydrochloride, hydrobromide and the like. Treatment of such starting material with a base such as, for example, ammonium hydroxide, in an inert organic solvent, such as, for example, chloroform, yields the novel compound of Formula II, wherein R is hydrogen. Subsequent acylation by conventional techniques with an appropriate acylating agent, e.g., acetyl chloride, acetic anhydride, propionyl chloride, butyryl chloride, benzoyl chloride, furoyl chloride and the like, yields the novel compound of Formula II, wherein R is the corresponding acyl. The novel compound of Formula I may be obtained by ring closure of the Formula II compound having R equal to hydrogen. The ring closure is advantageously accomplished with phosgene.

As is evident from the foregoing, the novel compound of Formula I wherein R is hydrogen, in addition to being a CNS depressant, is useful as a starting material for the production of the other novel compounds of this invention.

Therapeutically active acid addition salts of (II), wherein R is hydrogen, include those obtainable by reacting the base with an appropriate acid, as for example, an inorganic acid such as hydrochloric, thiocyanic, sulfuric, phosphoric and the like acids, or an organic acid such as acetic, lactic, oxalic, malonic, fumaric, benzoic and the like acids.

Due to the structural configuration of the subject compounds, it is evident that their existence in the form of several stereoisomers is possible. It is naturally intended that all such isomers are included within the scope of this invention.

The following examples are intended to illustrate, but not to limit, the scope of the present invention.

EXAMPLE I

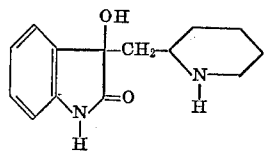

3-hydroxy-3-(2-piperidylmethyl)-2-indolinone hydrochloride 3-hydroxy-3-(2-pyridylmethyl) - 2 - indolinone hydrochloride (20 g., 0.072 mole) and 0.5 g. of platinum oxide are suspended in 250 ml. of methanol. The mixture is hydrogenated in a Parr bomb under a starting pressure of 50 lbs. After 6 hours, 0.5 g. of fresh catalyst is added and the mixture is hydrogenated for an additional 3.5 hours. The catalyst is removed by filtration and the solution evaporated in vacuo. The residue is crystallized from 80 ml. of isopropyl alcohol; yield 7.8 g., M.P. 209–210° C. Recrystallization from methanol-ether raises the M.P. to 210–212° C. (Isomer A). The isopropyl alcohol is removed from the original mother liquor and the residue crystallized from chloroform. Yield 7.3 g., M.P. (with foaming) 147–180° C. (Isomer B).

EXAMPLE II

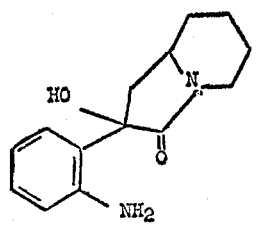

2-o-aminophenyl-2-hydroxyhexahydro-3(2H)-indolizinone (Isomer A)

3-hydroxy-3-(2-piperidylmethyl) - 2 - indolinone hydrochloride (Isomer A) (6.2 g., 0.022 mole) is suspended in a mixture of 10 ml. of ammonium hydroxide and 10 ml. of chloroform. The reaction mixture is stirred overnight at room temperature. The layers are separated and the organic layer is dried over magnesium sulfate and evaporated. The residue is crystallized from ethyl acetate yielding a white solid, M.P. 149–155° C. Recrystallization from ethyl acetate-hexane raises the M.P. to 160–162° C.

EXAMPLE III

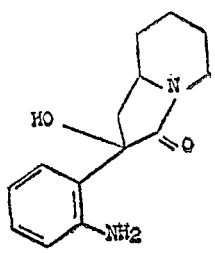

2-o-aminophenyl-2-hydroxyhexahydro-3(2H)-indolizinone (Isomer B)

3-hydroxy-3-(2-piperidylmethyl)-2-indolinone hydrochloride (Isomer B) (2.0 g., 0.0071 mole) is suspended in a mixture of 10 ml. of ammonium hydroxide and 10 ml. of chloroform. The reaction mixture is stirred overnight at room temperature. The layers are separated and the organic layer is dried over magnesium sulfate and evaporated, yielding a white solid, M.P. 147–149° C. The solid is recrystallized from ethyl acetate-hexane, M.P. 147–149° C.

EXAMPLE IV

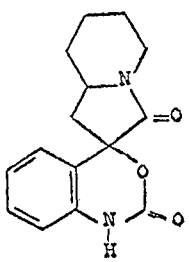

1',5',6',7',8',8a'-hexahydro-spiro[4H-3,1-benzoxazine-4',2'-indolizine]-2(1H)3'(2'H)-dione (Isomer A)

2-o-aminophenyl-2-hydroxyhexahydro-3-(2H)-indolizinone (Isomer A) (0.54 g., 0.0021 mole) is suspended in 10 ml. of ethyl acetate containing 1 ml. of triethylamine. The stirred suspension is cooled in an ice-bath and 0.21 g. (0.0021 mole) of phosgene, dissolved in 5 ml. of ethyl acetate is added over a period of 15 min. The reaction mixture is stirred at ice-bath temperature for 0.5 hr. and at room temperature for 2 hrs. The resulting suspension is poured into 4 N hydrochloric acid solution and extracted with methylene chloride. The methylene chloride layer is dried over anhydrous magnesium sulfate and the solvent is removed, yielding a white solid, M.P. 242–243° C. Recrystallization from methanol-ether raises the M.P. to 244–245° C.

EXAMPLE V

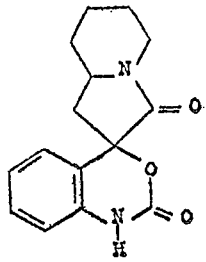

1,5',6',7',8',8a'-hexahydro-spiro[4H-3,1-benzoxazine-4',2'-indolizine]-2(1H)3'(2'H)-dione (Isomer B)

2-o-aminophenyl-2-hydroxyhexahydro-3-(2H)-indolizinone (Isomer B) (0.54 g. 0.0021 mole) is treated with 0.21 g. (0.0021 mole) of phosgene under conditions identical with those for Isomer A, yielding a white solid, M.P. 259–261° C. Recrystallization from methanol-ether raises the M.P. to 262–263.5° C.

EXAMPLE VI

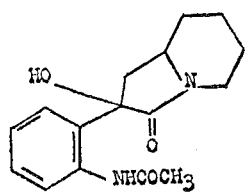

2-o-acetamidophenyl-2-hydroxyhexahydro-3-(2H)-indolizinone (mixture of isomers)

2-o-aminophenyl-2-hydroxyhexahydro-3-(2H)-indolizinone (mixture of isomers A and B) (10.4 g., 0.048 mole) is suspended in 110 ml. of pyridine. Acetyl chloride (0.57 g., 0.058 mole) is added to the stirred suspension over a period of 15 min. The reaction mixture is stirred at room temperature for 2 hrs. The solvent is partially removed in vacuo and the residue is suspended in 4 N hydrochloric acid and extracted with chloroform. The organic layer is dried over anhydrous magnesium sulfate. The solvent is removed yielding a yellow oil. Three recrystallizations from methanol yields a white solid, M.P. 195–198° C.

EXAMPLE VII

Acylation as in Example VI with equivalent quantities of propionyl chloride, butyryl chloride, phenylacetyl chloride, diphenylacetyl chloride, benzoyl chloride and furoyl chloride, respectively, in the place of the acetyl chloride used therein yields the corresponding acyl derivative.

The compounds of this invention are useful for their pharmacological properties. For example, both isomers of Formula I produce ataxia in mice, when administered intraperitoneally in a dose of 100 mg./kg. of body weight. Both isomers of Formula II where R is H produce a decrease of spontaneous motor activity in mice when administered intraperitoneally in a dose of 100 mg./kg. of body weight. When R is acetyl, ataxia is observed at 100 mg./kg. Ataxia as well as a decrease of spontaneous motor activity are used as indications of CNS depression. The subject compounds can be administered in conventional pharmaceutical formulations for oral and parenteral usages.

What is claimed is:

1. A chemical compound selected from the group consisting of:

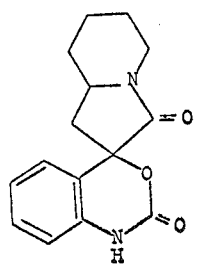 I and

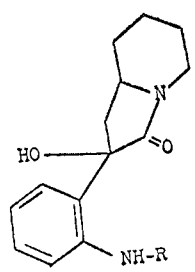 II wherein R is selected from the group consisting of hydrogen and acetyl, and the therapeutically active acid addition salts of (II), wherein R is hydrogen.

2. 2-o-aminophenyl - 2 - hydroxyhexahydro - 3(2H)-indolizinone.

3. 2 - o - acetamidophenyl - 2 - hydroxyhexahydro-3(2H)-indolizinone.

4. 1',5',6',7',8',8a' - hexahydro - spiro[4H - 3,1 - benzoxazine-4',2'-indolizine]-2(1H),3'(2'H)-dione.

References Cited

UNITED STATES PATENTS 3,259,620  7/1966  Moffett _____ 260—244

HENRY JILES, *Primary Examiner.*

R. T. BOND, *Assistant Examiner.*

U.S. Cl. X.R.

260—294, 294.7, 999